United States Patent [19]
Vivaldi et al.

[11] Patent Number: 4,975,225
[45] Date of Patent: Dec. 4, 1990

[54] MANUFACTURE OF MONOLITHIC, STIFF, LIGHTWEIGHT CERAMIC ARTICLES

[75] Inventors: Alexander M. Vivaldi, West Palm Beach; Christopher J. Duston, Lake Park; Pinke Halpert, West Palm Beach, all of Fla.

[73] Assignee: United Technologies Corporation, Hartford, Conn.

[21] Appl. No.: 320,204

[22] Filed: Mar. 7, 1989

[51] Int. Cl.$^5$ ............................................. C04B 33/28
[52] U.S. Cl. ....................................... 264/28; 264/56; 264/317; 419/5; 419/40
[58] Field of Search ............... 264/28, 317, 56; 419/5, 419/40

[56] References Cited

U.S. PATENT DOCUMENTS

| | | | |
|---|---|---|---|
| 3,325,881 | 6/1967 | Engelking | 264/317 |
| 3,512,571 | 5/1970 | Phelps | 264/63 |
| 3,848,040 | 11/1974 | Confer et al. | 264/317 |
| 3,907,949 | 9/1975 | Carlson | 264/317 |
| 4,341,725 | 7/1982 | Weaver | 264/28 |

FOREIGN PATENT DOCUMENTS 1095905  5/1986  Japan ............................ 264/317

*Primary Examiner*—James Derrington
*Attorney, Agent, or Firm*—Peter R. Ruzek

[57] ABSTRACT

A light-weight yet sturdy ceramic article, is manufactured by initially forming at least one fugitive core including a main portion and at least one holding portion projecting from the main portion and then positioning the fugitive core in a mold cavity bounded by a multitude of bounding surfaces so that the holding portion holds the main portion at predetermined spacings from all of the bounding surfaces. This is followed by filling the mold cavity around the fugitive core with a dense slip constituted by ceramic or metal particles in mixture with a liquid medium to form a ceramic or metal preform embedding the fugitive core in its interior and freezing the ceramic or metal preform, then the fugitive core is dissolved and escapes from the interior of the frozen ceramic or metal preform and finally the ceramic preform is converted into the ceramic article.

5 Claims, 1 Drawing Sheet

MANUFACTURE OF MONOLITHIC, STIFF, LIGHTWEIGHT CERAMIC ARTICLES

TECHNICAL FIELD

The present invention relates to the manufacture of ceramic articles in general and more particularly to the manufacture of lightweight ceramic articles provided with internal hollow spaces.

BACKGROUND ART

There is already known, for instance, from the U.S. Pat. No. 4,341,725, issued on July 27, 1982, a process of molding refractory and metal shapes by slip-casting, wherein a nucleating agent is added to the slip prior to the casting and to the subsequent freezing of the cast preform in order to keep the sizes of ice crystals forming in the cast preform during the freezing of the latter at a level sufficiently low to avoid structural damage to the preform that would result if the sizes of the ice crystals were excessive. While this patent mentions that the shape of the article produced by using this method may be quite intricate, it specifically describes the use of its method only in the context of the making of a simple tube of constant inner and outer diameters. Consequently, the disclosure of this patent is insufficient to indicate how its teachings could be employed in the making of more intricate articles, especially of complicated hollow lightweight articles.

Yet, it is highly desirable to use high stiffness, lightweight articles in many applications, especially but not exclusively in mobile, launched or dynamic applications where specific section stiffness ($EI/A\rho$) is a key performance parameter. Additionally, a high degree of thermally induced distortion control is required in some of such applications (e.g. in optical systems) in order to minimize distortion or optical misfigure. These applications typically depend on the selection of materials for the articles so as to have high thermal stability ($k/\alpha$). Hence, materials with high elastic moduli, high thermal conductivities, low densities, and low coefficients of thermal expansion are desirable for use at least in such applications.

Currently, the material of choice for such applications has been beryllium (Be), which is typically machined or formed by hot isostatic pressing into open webbed structures. Other materials which, in the same geometries, approach the specific section stiffness ($EI/A\rho$) of beryllium, include refractories such as silicon carbides, silicon nitride and similar materials which will be collectively referred to as ceramics. These materials, which are amenable to net shape forming, would surpass beryllium in stiffness and thermal performance if formed into closed-web geometries. Yet, forming closed-web structures in either metals or refractories so far required the use of complex tooling or extensive machining followed by bonding to produce the desired shapes. Such processing resulted in a cost-prohibitive product.

Accordingly, it is the general object of the invention to avoid the disadvantages of the prior art.

More particularly, it is an object of the present invention to provide a method of making lightweight yet sturdy ceramic articles, which method does not possess the disadvantages of the prior art methods of this type.

Still another object of the present invention is so to develop the method of the above type as to be able to utilize it in the manufacture of closed-web ceramic articles.

It is yet another object of the present invention to devise a method of above type which minimizes if not eliminates the development of the stresses in a frozen ceramic preform due to differential thermal expansion.

In keeping with these objects and others which will become apparent hereafter, one feature of the present invention resides in a method of manufacturing a lightweight yet sturdy ceramic article. According to the invention, this method includes first forming at least one fugitive core including a main portion and at least one holding portion projecting from the main portion and then positioning the fugitive core in a mold cavity bounded by a multitude of bounding surfaces so that the holding portion holds the main portion at predetermined spacings from all of the bounding surfaces. Thereafter, the mold cavity around the fugitive core is filled with a dense slip constituted by ceramic particles in mixture with a liquid medium to form a ceramic preform embedding the fugitive core in its interior, the ceramic preform is caused to freeze, and the fugitive core is caused to dissolve and escape from the interior of the frozen ceramic preform. Finally, the ceramic preform is converted into the ceramic article.

Thus, the present invention presents a process capable of forming closed-web structures in refractory or ceramic materials at costs significantly lower than either the previous by proposed closed-web manufacturing processes or the current technique for generating open-web beryllium structures.

BRIEF DESCRIPTION OF THE DRAWINGS

The present invention will be described in more detail below with reference to the accompanying drawing in which.

BEST MODE FOR CARRYING OUT THE INVENTION

Figure 1:
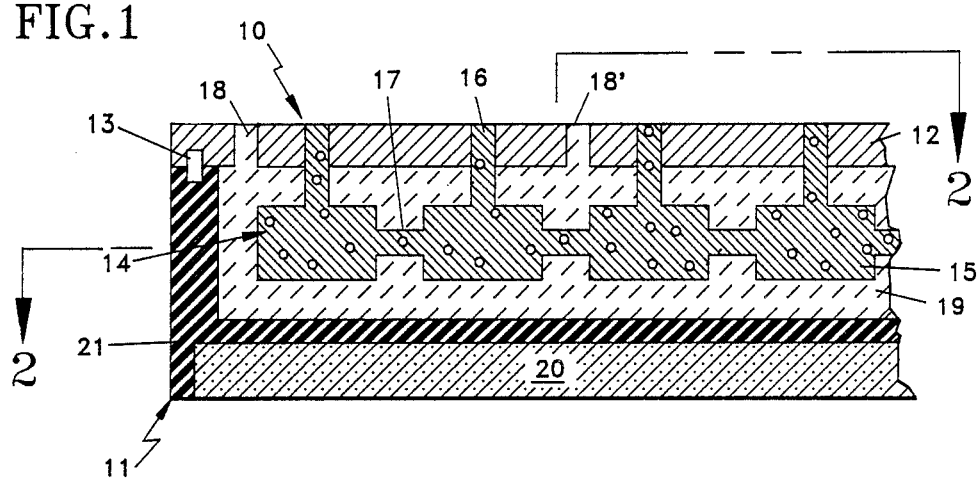
FIG. 1 is a cross-section view of a fragment of an example of a slip casting mold which accommodates fugitive cores of the present invention and is filled around the fugitive cores with a frozen slip preform.

Referring now to the drawing in detail, it may be seen that the reference numeral 10 has been used therein to identify a casting mold. The mold 10 includes a bottom portion 11 and a top portion 12 which together bound a mold cavity when assembled in the illustrated manner. Locating pins 13 are arranged at selected locations of the interface between the mold portions 11 and 12. The locating pins 13 serve to aid in properly positioning the top portion 12 relative to the bottom portion 11 during assembly.

A single multipartite core 14 is shown to be accommodated in the mold cavity. As illustrated, the core 14 includes a number of main portions or sections 15 and a holding portion 16 for each of the main sections 15. Each holding portion 16 is received in an aperture provided therefor in the top mold portion 12 and thus holds the respective associated main section 15 at spacings from all mold walls. The adjacent ones of the main sections 15 are interconnected by respective bridging sections 17 that extend across gaps existing between the main sections 15 and occupy only a minor portion of the respective gaps as considered in the longitudinal direction of such gaps. As shown, the bridging sections 17 are integral with both of the main sections 15 which they interconnect; however, they or portions thereof, could be connected with only one of the adjacent main sections 15, in which case each set of main, holding and/or bridging sections 15, 16, and 17 would constitute a separate core. In this case, the apertures receiving the holding sections 16 can have non-circular cross-sectional configurations so as to assure that the main portions 15 are held in the desired orientations and are prevented from turning about the axes of the holding sections 16.

The top mold portion 12 is shown to be provided with two ports 18 and 18' at selected regions thereof, with one of the ports 18 and 18' constituting an admission port for a ceramic slip and the other presenting an escape route for a fluid displaced by the slip during the filling of the mold cavity with the slip. When the cavity around the core 14 or the separate cores 15, 16 and/or 17 is filled with the slip, there is obtained a body 19 which is connected initially into a preform and ultimately in a final article. The reference numeral 19 will be used here to identify this body regardless of its consistency and strength.

Having so generally described the device in which the body 19 is being produced by slip casting, attention will now be directed to the discussion of the method of the present invention.

This method is excellently suited for forming monolithic, stiff, lightweight ceramic structures or articles 19 containing complex internal geometries in that the preformed core 14 or cores 15, 16 and/or 17 are trapped within the body 19, which is then frozen, whereafter the core 14 or cores 15, 16 and/or 17 is or are isothermally leached without any substantial damage to the frozen casting to create the desired internal geometries.

The article forming technique depends on the prior art process of forming known as slip casting, particularly that disclosed in the above-mentioned U.S. patent to which reference may be had for further details of the slip casting process as such. The expression "slip casting" is preferentially used herein to indicate a process where a pourable slip consisting of metal, ceramic carbon powders, or mixtures of such powders, and a liquid (usually water) is poured in a non-absorbent mold, the mixture is frozen, removed from the mold and freeze-dried to obtain a "green-state" body 19 ready for firing. As mentioned before, the present invention involves forming complex geometry cores 14 which define the desired lightweighting scheme from materials capable of dissolution by chemical attack at temperatures below the freezing point of the liquid used in the casting slip. These cores 14 are affixed to the mold 10 which defines the exterior geometry of the desired structure. The casting slip is introduced into the mold 10 and the assembly is frozen. After freezing, the exterior mold 10 is removed, the frozen casting or preform 19 is immersed in a temperature-matched pool of solvent until the cores 14 are dissolved. Access to the cores 14 by the solvent is provided by the protrusions or holding portions 16 of the cores 14 which extend to or above the frozen casting's external surfaces. After dissolution, the frozen casting or preform 19 can be freeze-dried and fired by prior-art processes.

EXAMPLE

A silicon carbide optical substrate measuring 10.6 cm in length, 7.5 cm in width, 1.0 cm in thickness, and containing 0.6 mm thick front and rear closure plates and 0.5 mm thick lateral interior webs was formed as follows: A casting slip was prepared by mixing the following materials in the quantities shown, and rolling in a jar mill for about 27 hours:

| Silicon Carbide powder (F-320) | 5,773.8 g |
|---|---|
| Silicon Carbide powder (~1.0 μm) | 4,220.0 g |
| Water | 1,313.7 g |
| Sodium Silicate | 34.8 g |
| Dimethyl Sulfoxide | 205.3 g |

Referring again to FIG. 1, the bottom portion 11 of the segmented casting mold 10 was constructed from graphite stiffeners 20 and G.E. RTV-700 room temperature vulcanizing rubber body 21 molded to emulate the desired external geometries. A multitude of the cores 15, 16, and 17 was made by expanding polystyrene beads averaging 2.5 mm in diameter to a density of approximately 0.07 g/cm$^3$ within the confines of an aluminum two-piece mold in a 120° C. bath of 55% water and 45% ethylene glycol (by weight). The formed core shape consisted of a 1.2 cm cube or main portion 15 containing a protruding stem or holding portion 16 on one face and a 0.25 mm stand-off tab or bridging portion 17 on each of the four faces adjacent to the stem 11. The top mold portion or fixturing plate 12, fabricated of aluminum, was indexed to the bottom mold portion 11. This fixturing plate 12 was pre-machined to accept the core stems 16 and locate them in the desired array. The resultant remaining mold cavity formed the desired final refractory shape.

Approximately 105.0 g of the slip prepared as described above was introduced into the mold cavity through the feed port 18 and the displaced air escaped through the escape port 18. The mold 10 and slip 19 were vibrated during the fill as well as for 15 minutes after to free entrapped air.

The assembled mold 10 and its contents 14, 19 were placed in a refrigerated compartment stabilized at −85° C. and allowed to remain for about 30 minutes. The mold 10 and its contents 14, 19 were subsequently removed from the refrigerated environment, and the bottom mold portion 11 and fixturing plate 12 disassembled to free the frozen preform 19. The frozen body 19 was allowed to equilibrate at a temperature of −62° C. in a separate refrigerated compartment for about 1 hour. A bath of methylene chloride was prepared and placed in the same refrigerated compartment. The preform 19 was then immersed into the methylene chloride bath for about 5 hours until the core dissolution was completed.

Thereafter, the frozen casting 19 was converted in steps into the final product or article by being first placed in a chamber which was evacuated to approximately 100 μm of Hg at room temperature. The vacuum pumping was continued for nearly 16 hours when the vacuum level discernibly increased to less than 50 μm of Hg indicating that the freeze-dying (sublimation) process had been substantially completed and that the casting 19 could be considered dry. The dried casting 19 was lightly sintered by subjecting it to 2050° C. in a partial pressure of argon atmosphere.

Figure 2:
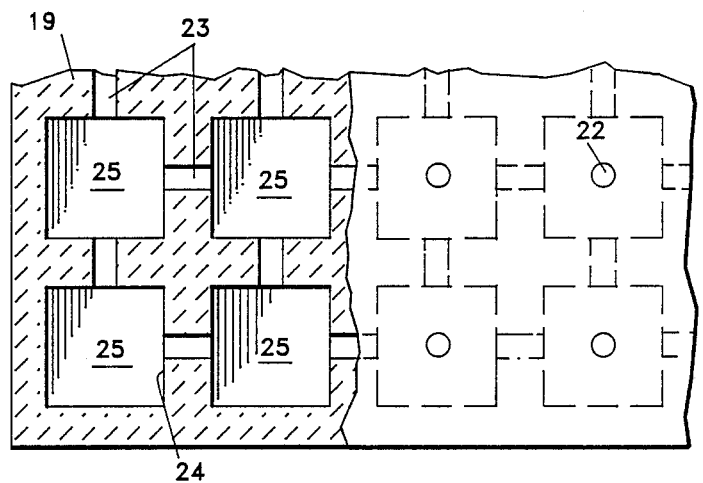
FIG. 2 is a partially sectioned fragmentary top elevational view taken along line 2—2 of FIG. 1 but showing only the frozen preform after its removal from the mold.

The thus partially sintered preform has, as shown in FIG. 2 of the drawings, a plurality of internal spaces 25 that are separated from one another by respective partitions 24 each of which has a small opening 23 therein at the location vacated by the dissolution of the respective holding portion or section 17. The internal spaces 25 of the sintered body were then packed with a paste mixture of 450.0 g of 45 μm boron nitride powder and 1.0 g of methocellulose dissolved in 840.0 g of water. The packing was accomplished via access holes 22 formed by the protrusion of the stems 16 through the top surface of the casting 19. The partially sintered casting 19 was densified by exposing it to 120.0 g of molten silicon at 1750° C. in a partial pressure of 1 mm of Hg of argon.

The resultant article 19 was a monolithic, high stiffness, lightweight structure whose top and bottom surfaces were subsequently machine ground to improve flatness to better than 0.025 mm. The bottom surface was then cladded with a 0.075 cm thick layer of silicon metal deposited using electron beam evaporation. This layer was then optically prepared by free abrasive grind to produce a specular reflective surface which was finally coated with a 2000 Å thick layer of gold to enhance reflectivity.

While the present invention has been illustrated and described as embodied in a particular construction of a lightweight article and of the fugitive core used in its manufacture, it will be appreciated that the present invention is not limited to this particular example; rather, the scope of protection of the present invention is to be determined solely from the attached claims.

We claim:

1. A method of manufacturing a light-weight yet sturdy ceramic article, comprising the steps of
   forming at least one fugitive core including a main portion and at least one holding portion projecting from the main portion;
   positioning the fugitive core in a mold cavity bounded by a multitude of bounding surfaces so that the holding portion holds the main portion at predetermined spacings from all of the bounding surfaces;
   filling the mold cavity around the fugitive core with a dense slip constituted of ceramic or metal particles in a mixture with a liquid medium to form a ceramic or metal preform embedding the fugitive core in its interior;
   freezing the ceramic or metal preform;
   causing the fugitive core to dissolve and escape from the interior of the frozen ceramic or metal preform, including contacting the fugitive core with a chemical agent that dissolves the material of the fugitive core;
   controlling the temperature of at least the chemical agent so as to be substantially equal to that of the frozen ceramic or metal preform just prior to said contacting; and
   converting the ceramic or metal preform into the ceramic or metal article.

2. The method as defined in claim 1, wherein said forming step further includes forming a plurality of additional fugitive cores similar to and separate from the one fugitive core; and wherein said positioning step further includes holding the main portions of the additional cores in the mold cavity by the holding portions of the additional fugitive core at respective distances from one another and from the main portion of the one fugitive core.

3. The method as defined in claim 1, wherein said forming step includes forming the main portion in a number of main sections separated from one another by respective gaps, and integral bridging sections extending across the gaps to interconnect the respective main sections and each occupying only a small portion of the length of the respective gap.

4. The method as defined in claim 1, wherein said controlling step further includes raising the temperature of the frozen ceramic preform from a subfreezing temperature obtaining during said freezing step to a higher yet still subfreezing temperature corresponding to that of the chemical agent.

5. The method as defined in claim 1, and further comprising the step of densifying the slip in the mold cavity, including subjecting the slip to vibrations.

* * * * *